United States Patent
Cao et al.

(10) Patent No.: US 10,242,111 B2
(45) Date of Patent: *Mar. 26, 2019

(54) NODE CONTROLLERS FOR HIERARCHICAL DATA STRUCTURES

(71) Applicant: INTERNATIONAL BUSINESS MACHINES CORPORATION, Armonk, NY (US)

(72) Inventors: Yang Cao, Beijing (CN); He Jiang Jia, Beijing (CN); Xiao Zhen Zhu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 189 days.

This patent is subject to a terminal disclaimer.

(21) Appl. No.: 15/077,148

(22) Filed: Mar. 22, 2016

(65) Prior Publication Data

US 2017/0277789 A1     Sep. 28, 2017

(51) Int. Cl.
*G06F 17/30* (2006.01)
*G06F 3/0485* (2013.01)
*G06F 3/0484* (2013.01)

(52) U.S. Cl.
CPC .... *G06F 17/30867* (2013.01); *G06F 3/04842* (2013.01); *G06F 3/04855* (2013.01); *G06F 17/30589* (2013.01)

(58) Field of Classification Search
USPC ................................................ 707/754, 736
See application file for complete search history.

(56) References Cited

U.S. PATENT DOCUMENTS 5,812,135 A    9/1998 Kotchey
6,222,559 B1   4/2001 Asano et al.
(Continued)

FOREIGN PATENT DOCUMENTS

EP    1632874 A2    3/2006
WO   2016114774 A1  7/2016

OTHER PUBLICATIONS

Mell et al., "The NIST Definition of Cloud Computing," National Institute of Standards and Technology, Sep. 2011, p. 1-3, Special Publication 800-145.
(Continued)

*Primary Examiner* — Hung T Vy
(74) *Attorney, Agent, or Firm* — Erik K. Johnson

(57) ABSTRACT

A method for filtering out nodes associated with hierarchical data structures is provided. The method may include generating node controllers on the hierarchical data structures. The method may include determining whether user actions are received on a first node controller, a second node controller, and a third node controller associated with the generated plurality of node controllers. The method may include filtering node levels associated with hierarchical data structures, and presenting the hierarchical data structures without the filtered out node levels. The method may include filtering out sibling nodes associated with the hierarchical data structures, and presenting the hierarchical data structures without the filtered out sibling nodes. The may further include reverse-collapsing first node levels and filtering out second node levels based on the reverse-collapsed first node levels, and presenting the hierarchical data structures without the filtered out second node levels.

13 Claims, 8 Drawing Sheets

(56) References Cited

U.S. PATENT DOCUMENTS

| | | | |
|---|---|---|---|
| 7,360,175 B2 | 4/2008 | Gardner et al. | |
| 7,984,388 B2 | 7/2011 | Dieberger et al. | |
| 8,898,592 B2 | 11/2014 | Loughlin et al. | |
| 2003/0065874 A1* | 4/2003 | Marron | G06F 17/30011 711/100 |
| 2004/0199539 A1* | 10/2004 | Richardson | G06F 17/30091 |
| 2005/0022129 A1* | 1/2005 | Borenstein | G06F 9/451 715/734 |
| 2009/0063517 A1 | 3/2009 | Wright et al. | |
| 2009/0300016 A1* | 12/2009 | Kile, Jr. | G06F 3/04817 |
| 2013/0132911 A1* | 5/2013 | Rotshtein | G06F 17/30941 715/854 |
| 2014/0207940 A1 | 7/2014 | Liu et al. | |
| 2015/0212998 A1 | 7/2015 | Perez et al. | |

OTHER PUBLICATIONS

IBM, "List of IBM Patents or Patent Applications Treated as Related (Appendix P)," Aug. 1, 2016, p. 1-2.

Cao et al., "Node Controllers for Hierarchical Data Structures," Application and Drawings, filed Jun. 27, 2016, 35 Pages, U.S. Appl. No. 15/193,173.

* cited by examiner

FIG. 2

| Date | running (km) | weight (kg) |
|---|---|---|
| ⊟ 2015 | | |
| ☐ Jan | | |
| ⊟ week1 | 6.3 | |
| ☐ day1 | 6.3 | 63 |
| run1 | 0.8 | 64 |
| ⊞ week2 | | |
| ⊞ week3 | | |
| ⊞ week4 | | |
| ☐ Feb | | |
| ⊞ week1 | | |
| ⊞ week2 | | |
| ⊞ week3 | | |
| ⊟ week4 | 7.5 | 63 |
| ⊟ day3 | | |

| Date | running (km) | weight (kg) |
|---|---|---|
| ⊟ day1 | 6.3 | 63 |
| run1 | 0.8 | 64 |
| ⊟ day3 | | |
| run12 | 1.6 | 63 |

NODE CONTROLLERS FOR HIERARCHICAL DATA STRUCTURES

BACKGROUND

The present invention relates generally to the field of computing, and more specifically, to hierarchical data.

Generally, data may be presented on hierarchical data structures, such as hierarchical data trees and tree tables. Specifically, hierarchical data structures are organized and structured to represent data using different levels. For example, hierarchical data trees may include nodes, such as parent nodes, child nodes and sibling nodes, to present the data and the relationship of the data on the hierarchical data trees. Specifically, for a hierarchical data tree based on dates, the hierarchical data structure may include the nodes "years">"months">"days". Specifically, the "years" may be the parent nodes to the child nodes that include the "months", and the "months" may be the parent nodes to the child nodes that may include the "days". Furthermore, the "year" nodes may be sibling nodes, the "month" nodes may be sibling nodes, and the "day" nodes may be sibling nodes. Additionally, users may be enabled to collapse and expand the nodes associated with hierarchical data trees.

SUMMARY

A method for filtering out at least one node associated with at least one hierarchical data structure is provided. The method may include generating a plurality of node controllers on the at least one hierarchical data structure. The method may include determining whether at least one user action is received on a first node controller associated with the generated plurality of node controllers. The method may include in response to the determination that the at least one user action is received on the first node controller associated with the generated plurality of node controllers, filtering out at least one node level associated with the at least one hierarchical data structure, and presenting the at least one hierarchical data structure without the filtered out at least one node level. The method may include determining whether the at least one user action is received on a second node controller associated with the generated plurality of node controllers. The method may include in response to the determination that the at least one user action is received on the second node controller associated with the generated plurality of node controllers, filtering out at least one sibling node associated with the at least one hierarchical data structure, and presenting the at least one hierarchical data structure without the filtered out at least one sibling node. The method may also include determining whether the at least one user action is received on a third node controller associated with the generated plurality of node controllers. The method may further in response to the determination that the at least one user action is received on the third node controller associated with the generated plurality of node controllers, reverse-collapsing at least one first node level and filtering out at least one second node level based on the reverse-collapsed at least one first node level, and presenting the at least one hierarchical data structure without the filtered out at least one second node level.

A computer system for filtering out at least one node associated with at least one hierarchical data structure is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include generating a plurality of node controllers on the at least one hierarchical data structure. The method may include determining whether at least one user action is received on a first node controller associated with the generated plurality of node controllers. The method may include in response to the determination that the at least one user action is received on the first node controller associated with the generated plurality of node controllers, filtering out at least one node level associated with the at least one hierarchical data structure, and presenting the at least one hierarchical data structure without the filtered out at least one node level. The method may include determining whether the at least one user action is received on a second node controller associated with the generated plurality of node controllers. The method may include in response to the determination that the at least one user action is received on the second node controller associated with the generated plurality of node controllers, filtering out at least one sibling node associated with the at least one hierarchical data structure, and presenting the at least one hierarchical data structure without the filtered out at least one sibling node. The method may also include determining whether the at least one user action is received on a third node controller associated with the generated plurality of node controllers. The method may further in response to the determination that the at least one user action is received on the third node controller associated with the generated plurality of node controllers, reverse-collapsing at least one first node level and filtering out at least one second node level based on the reverse-collapsed at least one first node level, and presenting the at least one hierarchical data structure without the filtered out at least one second node level.

A computer program product for filtering out at least one node associated with at least one hierarchical data structure is provided. The computer program product may include one or more computer-readable storage devices and program instructions stored on at least one of the one or more tangible storage devices, the program instructions executable by a processor. The computer program product may include program instructions to generate a plurality of node controllers on the at least one hierarchical data structure. The computer program product may further include program instructions to determine whether at least one user action is received on a first node controller associated with the generated plurality of node controllers. The computer program product may also include program instructions to, in response to the determination that the at least one user action is received on the first node controller associated with the generated plurality of node controllers, filter out at least one node level associated with the at least one hierarchical data structure, and present the at least one hierarchical data structure without the filtered out at least one node level. The computer program product may further include program instructions to determine whether the at least one user action is received on a second node controller associated with the generated plurality of node controllers. The computer program product may also include program instructions to, in response to the determination that the at least one user action is received on the second node controller associated with the generated plurality of node controllers, filter out at least one sibling node associated with the at least one hierarchical data structure, and present the at least one hierarchical data structure without the filtered out at least one sibling node.

The computer program product may further include program instructions to determine whether the at least one user action is received on a third node controller associated with the generated plurality of node controllers. The computer program product may also include program instructions to, in response to the determination that the at least one user action is received on the third node controller associated with the generated plurality of node controllers, reverse-collapse at least one first node level and filter out at least one second node level based on the reverse-collapsed at least one first node level, and present the at least one hierarchical data structure without the filtered out at least one second node level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 2 is an example of a hierarchical node controller program for filtering out node levels using a first node level controller according to one embodiment;

DETAILED DESCRIPTION

Figure 1:
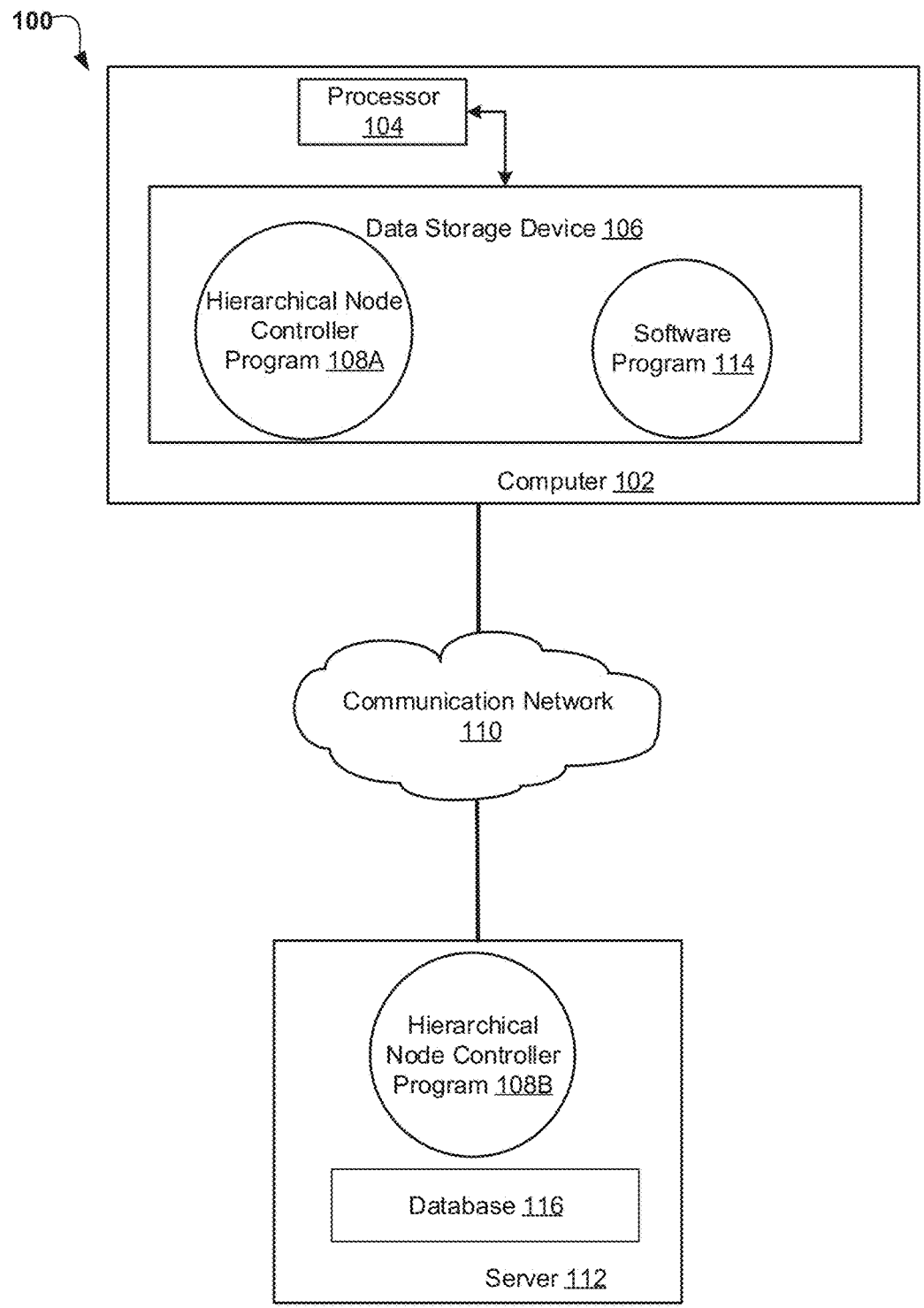
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to hierarchical data. The following described exemplary embodiments provide a system, method and program product for filtering out nodes associated with hierarchical data structures. Therefore, the present embodiment has the capacity to improve the technical field associated with hierarchical data by enabling users to filter out nodes using node controllers to improve navigation and compare data on hierarchical data structures. Specifically, the present embodiment may generate node level controllers to filter out different levels of nodes presented on hierarchical data structures, and may generate sibling node controllers to filter out different sibling nodes presented on hierarchical data structures.

As previously described with respect to hierarchical data, data may be presented on hierarchical data structures that may include nodes, such as parent nodes, child nodes, and sibling nodes. For example, and as previously described, a hierarchical data tree based on dates may include the nodes "years">"months">"days". Specifically, the "years" may be the parent nodes and the "months" may be the child nodes to the "years", and the "months" may be the parent nodes and the "days" may be the child nodes to the "months". Furthermore, the "year" nodes may be sibling nodes, the "month" nodes may be sibling nodes, and the "day" nodes may be sibling nodes. For example, the "month" node for January may be a sibling node to the "month" node for March. Additionally, users may be enabled to collapse and expand the nodes associated with hierarchical data structures. For example, to present data under the "day" nodes, the "day" nodes may be expanded.

However, despite expanding the "day" nodes, to compare data between the different "day" nodes is difficult when numerous nodes are present between the "day" nodes. For example, users may want to compare data associated with a "day" node under month January to data associated with a "day" node under month December. However, nodes associated with the months February-November may be presented between the "day" node for January and the "day" node for December. Therefore, users may not simultaneously view the compared data on a viewing screen, and instead may have to scroll up/down the viewing screen to view data associated with the "day" node under the month of January to data associated with the "day" node under the month of December. As such, it may be advantageous, among other things, to provide a system, method and program product for filtering out nodes associated with hierarchical data structures to improve the presentation of compared data. Specifically, the system, method and program product may generate node level controllers to reduce hierarchical data structures by filtering out the node levels presented on the hierarchical data structures, and may generate sibling node controllers to reduce the hierarchical data structures by filtering out different sibling nodes presented on the hierarchical data structures.

According to at least one implementation of the present embodiment, node controllers may be generated on nodes associated with hierarchical data structures. Then, whether user actions are received on the node controllers may be determined. Next, in response to received user actions on the node controllers, node levels may be filtered out to compare data. Furthermore, in response to user actions received on the node controllers, sibling nodes may be filtered out to compare data. Thereafter, the hierarchical data structures may be presented without the filtered nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for filtering out nodes associated with hierarchical data structures.

According to at least one implementation, node controllers may be generated on nodes associated with hierarchical data structures. Then, whether user actions are received on the node controllers may be determined. Next, in response to received user actions on the node controllers, node levels may be filtered out. Furthermore, in response to user actions received on the node controllers, sibling nodes may be filtered out. Thereafter, the hierarchical data structures may be presented without the filtered nodes.

Referring now to FIG. 1, an exemplary networked computer environment 100 in accordance with one embodiment is depicted. The networked computer environment 100 may include a computer 102 with a processor 104 and a data storage device 106 that is enabled to run a hierarchical node controller program 108A and a software program 114. The software program 114 may be an application program such as an internet browser and an email program. The hierarchical node controller program 108A may communicate with the software program 114. The networked computer environment 100 may also include a server 112 that is enabled to run a hierarchical node controller program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 6, server computer 112 may include internal components 810a and external components 910a, respectively, and client computer 102 may include internal components 810b and external components 910b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the hierarchical node controller program 108A, 108B may interact with a database 116 that may be embedded in various storage devices, such as, but not limited to a mobile device 102, a networked server 112, or a cloud storage service.

According to the present embodiment, a program, such as a hierarchical node controller program 108A and 108B may run on the client computer 102 or on the server computer 112 via a communications network 110. The hierarchical node controller program 108A, 108B may filter out nodes associated hierarchical data structures. Specifically, a user using a computer, such as computer 102, may run a hierarchical node controller program 108A, 108B, that interacts with a software program 114, to generate node level controllers on hierarchical data structures to filter out different levels of nodes presented on the hierarchical data structures, and may generate sibling node controllers on hierarchical data structures to filter out different sibling nodes presented on hierarchical data structures.

Referring now to FIG. 2, an example 200 of a hierarchical node controller program 108A, 108B (FIG. 1) for filtering out node levels using a first node level controller according to one embodiment is depicted. As previously described in FIG. 1, the hierarchical node controller program 108A, 108B (FIG. 1) may filter out nodes associated with hierarchical data structures. Specifically, a hierarchical data structure may include a hierarchical data tree, such as hierarchical data tree 202A, 202B. Furthermore, the hierarchical node controller program 108A, 108B (FIG. 1) may filter out node levels, such as node levels 204a, 204b, by using node controllers, such as first node level controller 206a, 206b. For example, a hierarchical data tree 202A may include headers 208a, 208b such as "Date", "running", and "weight". Furthermore, the hierarchical data tree 202A may include nodes 204a such as "year", "month", "week", "day", and "run". Therefore, a user may want to view and compare the data associated with the node "run1" that is under the nodes "January", "week1", and "day1" with the data associated with a node "run12" that is under the nodes "February", "week4", and "day3". However, the data associated with the node "run12" may not be viewable on the hierarchical data tree 202A due to the number of nodes 204a presented.

As such, the hierarchical node controller program 108A, 108B (FIG. 1) may generate a first node level controller 206a, 206b on the hierarchical data tree 202A. Specifically, the hierarchical node controller program 108A, 108B (FIG. 1) may generate a first node level controller 206a, 206b, such as a scroll bar, on the "Date" header 208a, 208b. Then, using the first node level controller 206a, users may be enabled to filter out node levels. Specifically, the scroll bar 206a, 206b may correspond to the number of node levels associated with the hierarchical data tree 202A, 202B. Therefore, using the first node level controller 206a, 206b, the hierarchical node controller program 108A, 108B (FIG. 1) may filter out node levels 204a, 204b based on the position of the scroll bar 206a, 206b. For example, on the hierarchical data tree 202B, in response to user actions to position the scroll bar associated with the first node level controller 206b to a distance right, the hierarchical node controller program 108A, 108B (FIG. 1) may filter out the node levels 204a, 204b associated with the "year", "month", and "week". Thereafter, the hierarchical node controller program 108A, 108B (FIG. 1) may just present the nodes 204b associated with "day" and "run" without the filtered out nodes 204a, and therefore enable users to compare the data associated with the node "run1" 204b with the data associated with the node "run12" 204b.

Figure 3:
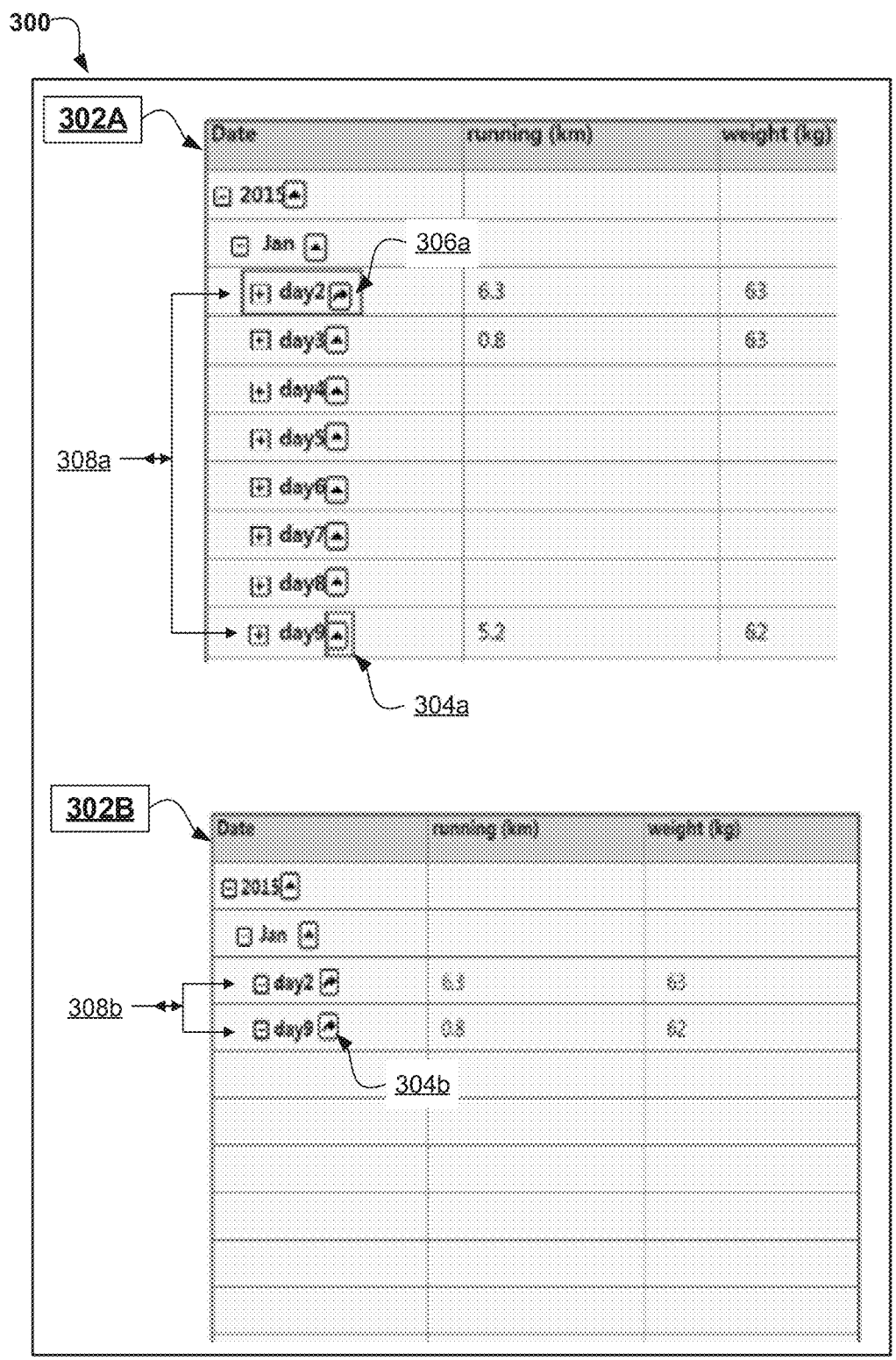
FIG. 3 is an example of a hierarchical node controller program for filtering out sibling nodes using sibling node controllers according to one embodiment.

Referring now to FIG. 3, an example 300 of a hierarchical node controller program 108A, 108B (FIG. 1) for filtering out sibling nodes 308a, 308b using sibling node controllers 304a, 306a, and 304b according to one embodiment is depicted. As previously described in FIG. 1, the hierarchical node controller program 108A, 108B (FIG. 1) may filter out nodes associated with hierarchical data structures 302A, 302B. Specifically, a hierarchical data structure 302A, 302B may include a hierarchical data tree, such as hierarchical data tree 302A, 302B. Furthermore, the hierarchical node controller program 108A, 108B (FIG. 1) may filter out sibling nodes, such as sibling nodes 308a, 308b, by using node controllers, such as sibling node controllers 304a, 306a, and 304b. For example, a hierarchical data tree 302A, 302B may include the sibling nodes 308a, 308b such as nodes "day1" (not shown), "day2", "day3", "day4", "day5", "day6", "day7", "day8", and "day9". Additionally, a user may want to view and compare the data associated with the node "day2" with just the data associated with the sibling node "day9".

As such, the hierarchical node controller program 108A, 108B (FIG. 1) may generate sibling node controllers 304a and 306a on the hierarchical data tree 302A. For example, the hierarchical node controller program 108A, 108B (FIG. 1) may generate sibling node controllers 304a, 306a, 304b, such as arrow buttons, on the sibling "day" nodes 308a, 308b. Then, using the sibling node controllers 304a, 306a, users may be enabled to filter out the sibling nodes 308a. Specifically, on the hierarchical data tree 302A, in response to a user clicking on the sibling node controller 306a, the "day 2" sibling node 308a may be put on a collapsed status, as shown by the arrow button associated with the sibling node controller 306a pointing to the right, to indicate that nodes above the "day 2" sibling node 308a are filtered out, and to indicate that the "day 2" sibling node 308a may not be filtered out while in collapsed status. As such, and as presented on the hierarchical data tree 302A, 302B, the hierarchical node controller program 108A, 108B (FIG. 1) may filter out the "day 1" sibling node 308a above the "day 2" sibling node 308a.

Thereafter, in response to a user clicking on the sibling node controller 304a that includes the "up" arrow on the "day 9" sibling node 308a, the hierarchical node controller program 108A, 108B (FIG. 1) may filter out the sibling nodes 308a above the "day 9" sibling node 308a by reverse collapsing the "day 9" sibling node up to the "day 2" sibling node 308a that is in the collapsed status. Specifically, as presented on hierarchical data tree 302B, the hierarchical node controller program 108A, 108B (FIG. 1) may filter out the sibling nodes 308a "day3", "day4", "day5", "day6", "day7", and "day8", so that just the "day 2" sibling node 308b and the "day 9" sibling node 308b may be viewed and compared. Furthermore, the hierarchical node controller program 108A, 108B (FIG. 1) may enable users to restore the filtered out sibling nodes 308a by clicking on the sibling node controllers 306a, 304b. For example, in response to a user clicking on the sibling node controller 306a, the "day 2" sibling node 308b may be taken off collapsed status, and the "day 1" sibling node 308b above the "day 2" sibling node 308b may be restored.

Figure 4:
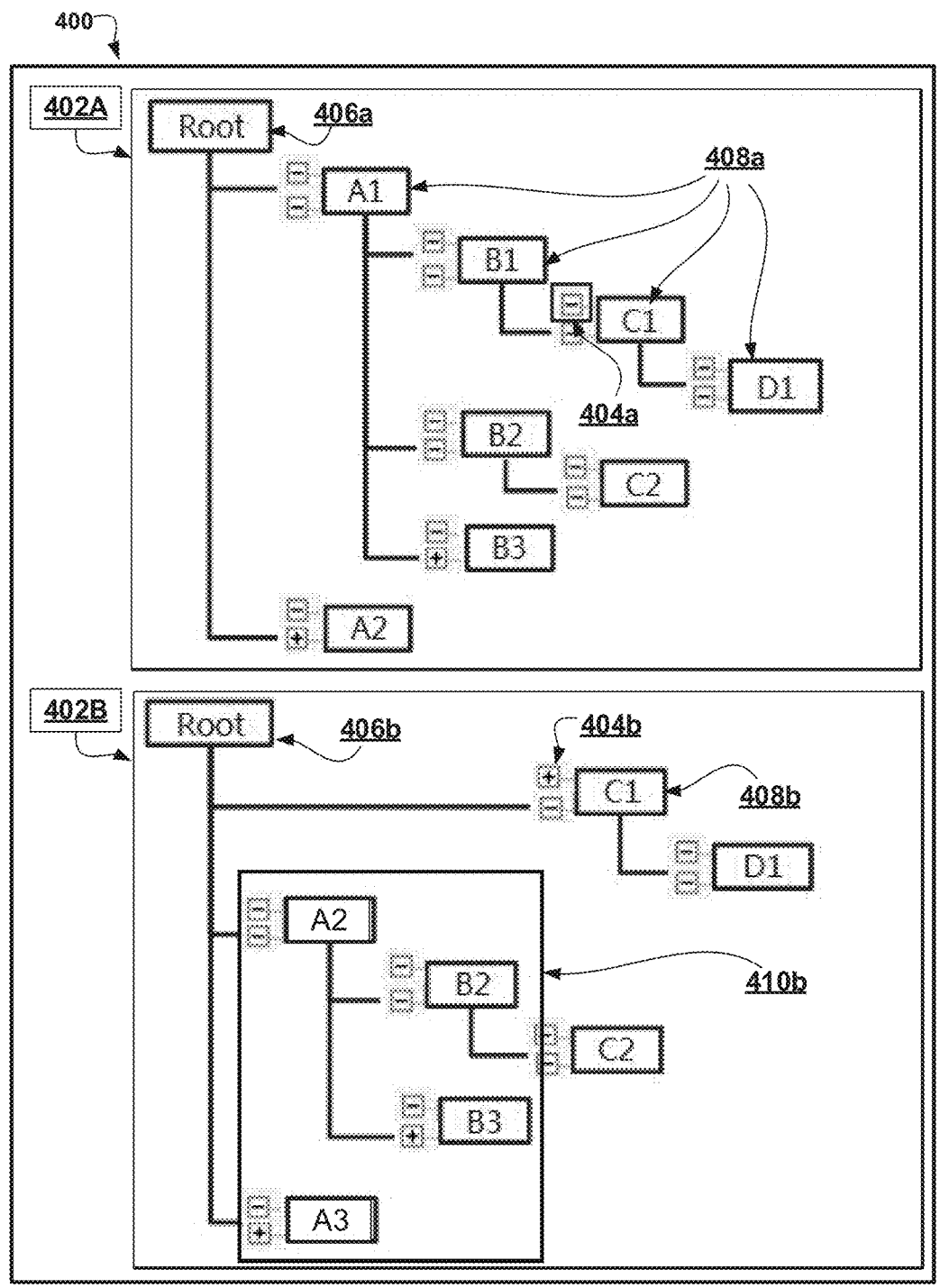
FIG. 4 is an example of a hierarchical node controller program for filtering out node levels using second node level controllers according to one embodiment.

Referring now to FIG. 4, an example 400 of a hierarchical node controller program 108A, 108B (FIG. 1) for filtering out nodes levels 204a, 204b (FIG. 2) using second node level controllers according to one embodiment is depicted. As previously described in FIG. 2, the hierarchical node controller program 108A, 108B (FIG. 1) may filter out node levels 204a, 204b (FIG. 2) associated with hierarchical data structures 202A, 202B (FIG. 2) using first node controllers 206, 206b (FIG. 2). Furthermore, the hierarchical node controller program 108A, 108B (FIG. 1) may filter out node levels, such as the node levels 408a, 408b, by using second node level controllers 404a, 404b. For example, a hierarchical data tree 402A may include a root node 406a and node levels 408a, such as node levels A, B, C, and D. Furthermore, users may want to filter out, or reverse collapse, the different node levels 408a.

As such, the hierarchical node controller program 108A, 108B (FIG. 1) may generate second node level controllers 404a on the hierarchical data tree 402A. Specifically, the hierarchical node controller program 108A, 108B (FIG. 1) may generate second node level controllers 404a, such as node toggles 404a, to enable users to filter out, or reverse collapse, node levels 408a. For example, and as described on hierarchical data tree 402B, in response to a user clicking on the second node level controller 404a associated with the C1 node level 408a, the hierarchical node controller program 108A, 108B (FIG. 1) may reverse collapse the C1 node level 408b up to the root node 406b to thereby filter out the A1 and B1 node levels 408a that are above the C1 node level, and still maintain the A and B node levels 410b below the C1 node level.

Figure 5:
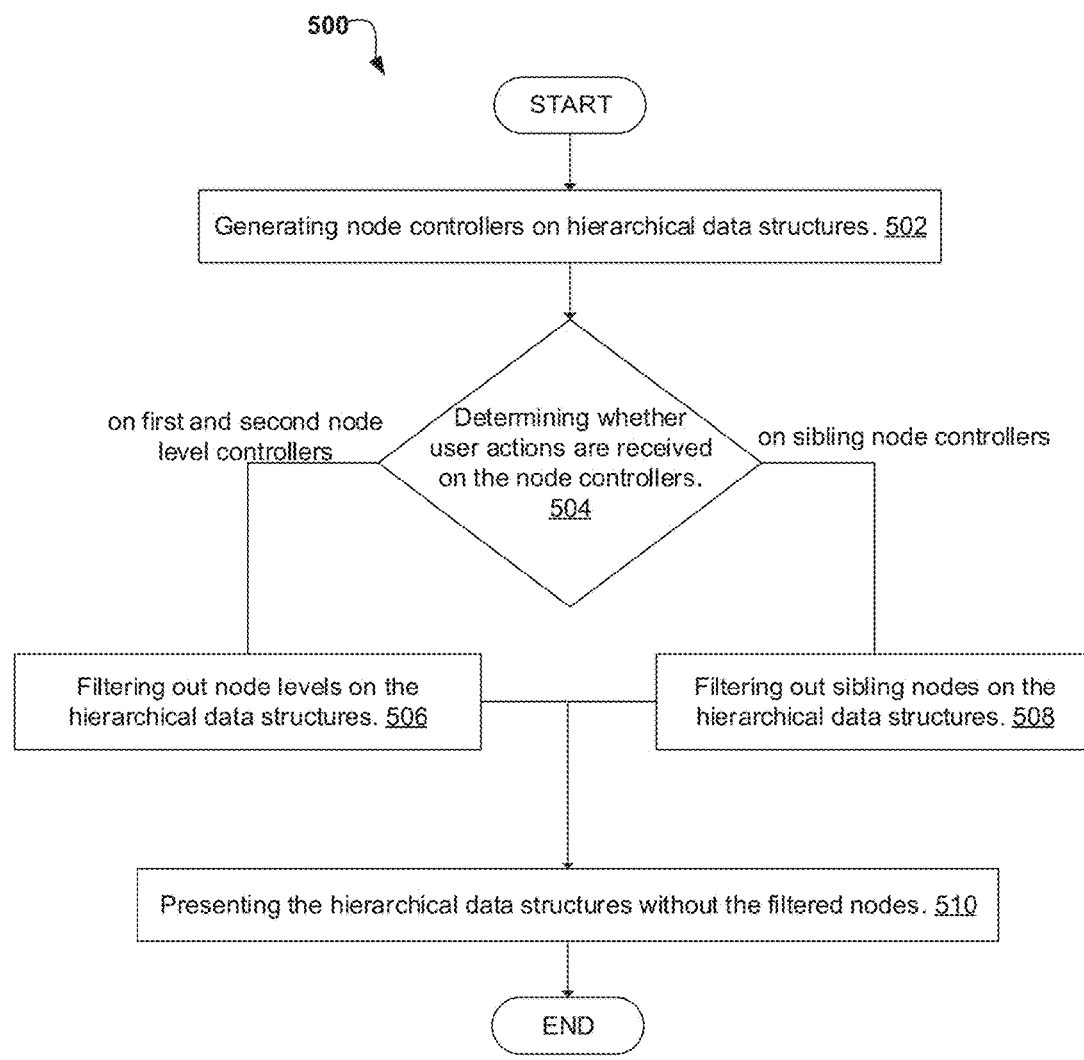
FIG. 5 is an operational flowchart illustrating the steps carried out by a program for filtering out nodes associated with hierarchical data structures according to one embodiment.

Referring now to FIG. 5, an operational flowchart 500 illustrating the steps carried out by a program for filtering out nodes 204a, 204b, 308a, 308b, 408a, 408b (FIGS. 2-4) associated with hierarchical data structures 202A, 202B, 302A, 302B, 402A, 402B (FIGS. 2-4) according to one embodiment is depicted. At 502, the hierarchical node controller program 108A, 108B (FIG. 1) may generate node controllers 206a, 206b, 304a, 306a, 304b, 404a, 404b (FIGS. 2-4) on hierarchical data structures 202A, 202B, 302A, 302B, 402A, 402B (FIGS. 2-4). Specifically, according to one embodiment, the hierarchical node controller program 108A, 108B (FIG. 1) may generate first node level controllers 206a, 206b (FIG. 2), sibling node controllers 304a, 306a, 304b (FIG. 3), and second node level controllers 404a, 404b (FIG. 4). For example, and as previously described in FIG. 2, the hierarchical node controller program 108A, 108B (FIG. 1) may generate a first node level controller 206a, 206b (FIG. 2), such as a scroll bar, on the "Date" header 208a, 208b (FIG. 2) of a hierarchical data tree 202A, 202B (FIG. 2). Also, for example, and as previously described in FIG. 3, the hierarchical node controller program 108A, 108B (FIG. 1) may generate sibling node controllers 304a, 306a, and 304b (FIG. 3), such as arrow buttons, on the sibling "day" nodes 308a, 308b (FIG. 3) associated with the hierarchical data tree 302A, 302B (FIG. 3). Furthermore, for example, the hierarchical node controller program 108A, 108B (FIG. 1) may generate second node level controllers 404a, 404b (FIG. 4), such as a node toggles, on the nodes 408a, 408b (FIG. 4).

Next, at 504, the hierarchical node controller program 108A, 108B (FIG. 1) may determine whether user actions are received on the node controllers 206a, 206b, 304a, 306a, 304b, 404a, 404b (FIGS. 2-4). Specifically, according to one embodiment, the hierarchical node controller program 108A, 108B (FIG. 1) may receive actions on the first node level controllers 206a, 206b (FIG. 2), the sibling node controllers 304a, 306a, 304b (FIG. 3), and the second node level controllers 404a, 404b (FIG. 4). For example, and as previously described in FIG. 2, the hierarchical node controller program 108A, 108B (FIG. 1) may determine that a user action, such as a user clicking on and positioning the scroll bar associated with the first node level controller 206b (FIG. 2), is received. Also, for example, and as previously described in FIG. 3, the hierarchical node controller program 108A, 108B (FIG. 1) may determine whether a user action, such as a user clicking on the arrow button on the sibling node controller 306a (FIG. 3), is received. Furthermore, for example, the hierarchical node controller program 108A, 108B (FIG. 1) may determine whether a user action, such as a user clicking on the node toggle 404a (FIG. 4) associated with a node level 408a (FIG. 4) is received.

Then, at 506, in response to received user actions on the node controllers 206a, 206b (FIG. 2), the hierarchical node controller program 108A, 108B (FIG. 1) may filter out node levels 204a, 204b (FIG. 2). Specifically, and as previously described in FIGS. 2 and 4, the hierarchical node controller program 108A, 108B (FIG. 1) may filter out node levels, such as node levels 204a, 204b, 408a, 408b (FIGS. 2 and 4), in response to receiving user actions on the first node level controllers 206a, 206b (FIG. 2) and the second node level controllers 404a, 404b (FIG. 4). For example, a hierarchical data tree 202A (FIG. 2) may include headers 208a, 208b (FIG. 2), such as "Date", "running", and "weight". Furthermore, the hierarchical data tree 202A (FIG. 2) may include nodes 204a (FIG. 2), such as "year", "month", "week", "day", and "run". Additionally, a user may want to view and compare the data associated with the node "run1" 204a, 204b (FIG. 2) that is under the nodes "January", "week1", and "day1" 204a (FIG. 2), with the data associated with a node "run12" 202b (FIG. 2) that is under the nodes "February", "week4", and "day3" 204a (FIG. 2). However, the data associated with the node "run12" 202b (FIG. 2) may not be viewable on the hierarchical data tree 202A (FIG. 2). Therefore, the hierarchical node controller program 108A, 108B (FIG. 1) may generate a first node level controller 206a, 206b (FIG. 2), such as a scroll bar, on the "Date" header 208a, 208b (FIG. 2). Then, in response to receiving a user action to position the scroll bar associated with the first node level controller 206a, 206b (FIG. 2) to the right distance, the hierarchical node controller program 108A, 108B (FIG. 1) may filter out the node levels 204a (FIG. 2) associated with the "year", "month", and "week".

Furthermore, at 508, in response to receiving user actions on the node controllers 304a, 306a, 304b (FIG. 3), the hierarchical node controller program 108A, 108B (FIG. 1) may filter out sibling nodes to compare data. Specifically, and as previously described in FIG. 3, the hierarchical node controller program 108A, 108B (FIG. 1) may filter out sibling nodes, such as sibling nodes 308a (FIG. 3), in response to receiving user actions on the sibling node controllers 304a, 306a (FIG. 3). For example, a hierarchical data tree 302A, 302B (FIG. 3) may include sibling nodes 308a, 308b (FIG. 3), such as sibling nodes "day1" (not shown), "day2", "day3", "day4", "day5", "day6", "day7", "day8", and "day9". Additionally, a user may want to just view and compare the data associated with the sibling node "day2" 308a (FIG. 3) with the data associated with the sibling node "day9" 308a (FIG. 3).

Therefore, the hierarchical node controller program 108A, 108B (FIG. 1) may generate sibling node controllers 304a, 306a (FIG. 3) on the hierarchical data tree 302A (FIG. 3). Specifically, according to one embodiment, the hierarchical node controller program 108A, 108B (FIG. 1) may generate sibling node controllers 304a, 306a, and 304b (FIG. 3), such as arrow buttons, on the sibling "day" nodes 308a, 308b (FIG. 3). Then, in response to receiving user actions on the sibling node controllers 304a, 306a, and 304b (FIG. 3), such as a user clicking on the arrow button associated with the sibling node controller 306a (FIG. 3), the "day 2" sibling node 308a (FIG. 3) may be put on a collapsed status, as indicated by the arrow button associated with the sibling node controller 306a (FIG. 3) pointing to the right, and the "day 1" sibling node 308a (FIG. 3) above the "day 2" sibling node 308a (FIG. 3) may be filtered out. Thereafter, in response to a user clicking on the sibling node controller 304a (FIG. 3) associated with the "day 9" sibling node 308a (FIG. 3), the hierarchical node controller program 108A, 108B (FIG. 1) may filter out the sibling nodes 308a (FIG. 3) above the "day 9" sibling node 308a (FIG. 3) by reverse collapsing the "day 9" sibling node 308a (FIG. 3) up to the "day 2" sibling node 308a (FIG. 3) that is in the collapsed status. Therefore, on hierarchical data tree 302B (FIG. 3), the hierarchical node controller program 108A, 108B (FIG. 1) may filter out the sibling nodes 308a (FIG. 3) "day1", "day3", "day4", "day5", "day6", "day7", and "day8", and the sibling node controller 304b (FIG. 3) associated with the "day 9" sibling node 308b (FIG. 3) may also be put on collapsed status to indicate that nodes above the "day 9" sibling node 308b (FIG. 3) are filtered out, and to indicate that the "day 9" sibling node 308b (FIG. 3) may not be filtered out while in collapsed status.

Additionally, the hierarchical node controller program 108A, 108B (FIG. 1) may generate second node level controllers 404a, 404b (FIG. 4) on hierarchical data trees 402A, 402B (FIG. 4). Specifically, the hierarchical node controller program 108A, 108B (FIG. 1) may generate second node level controllers 404a (FIG. 4), such as additional node toggles 404a (FIG. 4), to enable users to filter out, or reverse collapse, node levels 408a (FIG. 4). For example, and as described on hierarchical data tree 402B (FIG. 4), in response to a user clicking on the second node level controller 404a (FIG. 4) associated with the C1 node level 408a (FIG. 4), the hierarchical node controller program 108A, 108B (FIG. 1) may reverse collapse the C1 node level 408b (FIG. 4) up to the root node 406b (FIG. 4) to filter out the A1 and B1 node levels 408a (FIG. 4) that are above the C1 node level but maintain the A2 and B2 node levels 408b (FIG. 4).

Next, at 510, the hierarchical node controller program 108A, 108B (FIG. 1) may present the hierarchical data structures 202A, 202B, 302A, 302B, 402A, 402B (FIGS. 2-4) without the filtered out nodes 204a, 308a, 408a (FIGS. 2-4). As previously described in steps 506 and 508, the hierarchical node controller program 108A, 108B (FIG. 1) may filter out node levels 204a (FIG. 2) and sibling nodes 308a (FIG. 3) to compare data. For example, and as previously described at step 506, the hierarchical node controller program 108A, 108B (FIG. 1) may generate a first node level controller 206a, 206b (FIG. 2), such as a scroll bar, on the "Date" header 208a, 208b (FIG. 2), and in response to receiving a user action to position the scroll bar associated with the first node level controller 206a, 206b (FIG. 2) to the right, the hierarchical node controller program 108A, 108B (FIG. 1) may filter out the node levels 204a (FIG. 2) associated with the "year", "month", and "week". As such, on the hierarchical data tree 202B (FIG. 2), the hierarchical node controller program 108A, 108B (FIG. 1) may present the data associated with the nodes "day 1" and "run1" with just the data associated with the sibling nodes "day 3" and "run 12" to enable users to view and compare data without the filtered out nodes 204a (FIG. 2).

It may be appreciated that FIGS. 2-4 provide only illustrations of one implementation and do not imply any limitations with regard to how different embodiments may be implemented. Many modifications to the depicted environments may be made based on design and implementation requirements.

Figure 6:
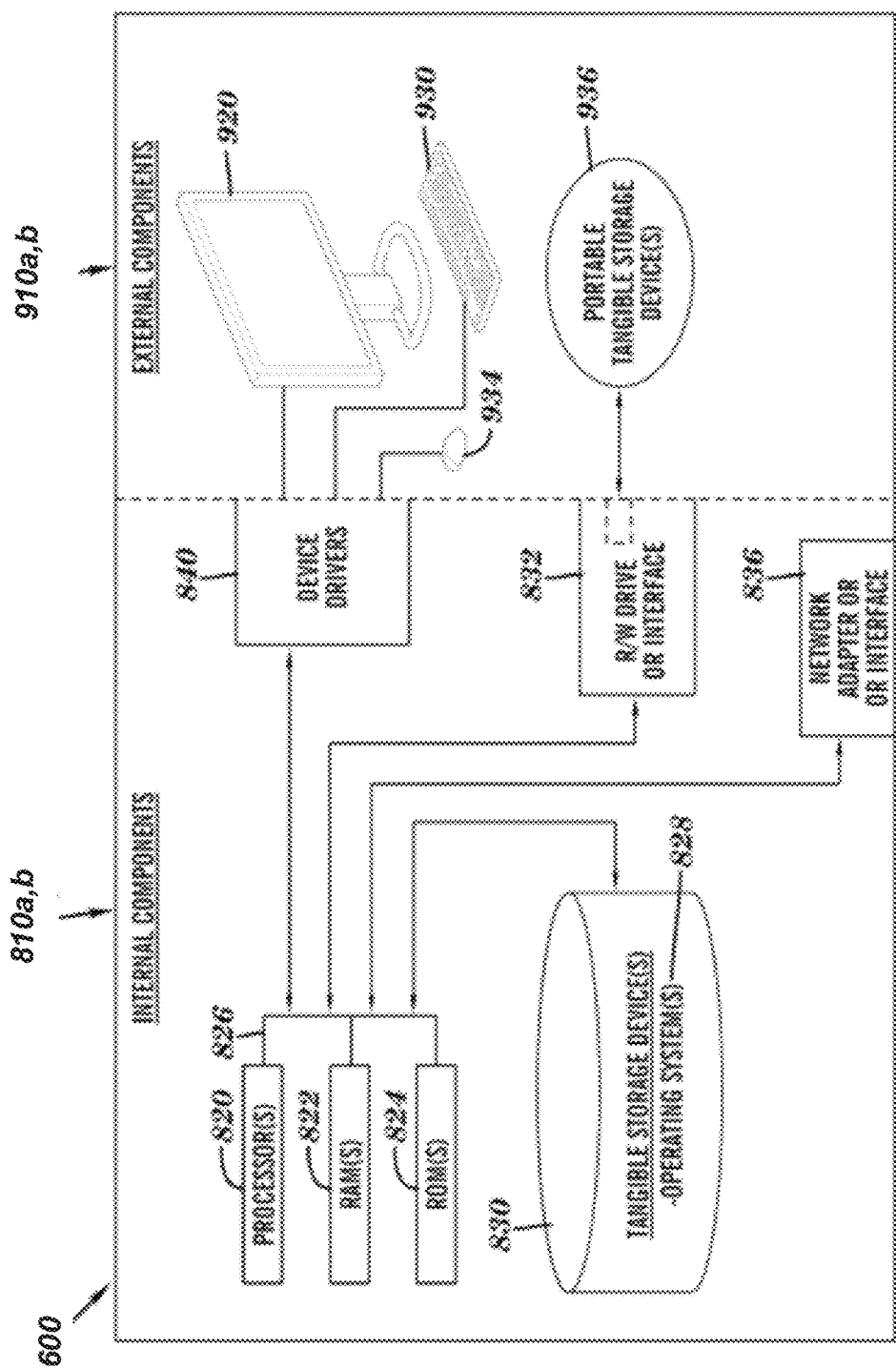
FIG. 6 is a block diagram of the system architecture of a program for filtering out nodes associated with hierarchical data structures according to one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 810, 910 is representative of any electronic device capable of executing machine-readable program instructions. Data processing system 810, 910 may be representative of a smart phone, a computer system, PDA, or other electronic devices. Examples of computing systems, environments, and/or configurations that may represented by data processing system 810, 910 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 810a, b and external components 910a, b illustrated in FIG. 6. Each of the sets of internal components 810a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the hierarchical node controller program 108A (FIG. 1) in client computer 102 (FIG. 1), and the hierarchical node controller program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 810a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an hierarchical node controller program 108A and 108B (FIG. 1), can be stored on one or more of the respective portable computer-readable tangible storage devices 936, read via the respective R/W drive or interface 832 and loaded into the respective hard drive 830.

Each set of internal components 810a, b also includes network adapters or interfaces 836 such as a TCP/IP adapter cards, wireless Wi-Fi interface cards, or 3G or 4G wireless interface cards or other wired or wireless communication links. The hierarchical node controller program 108A (FIG. 1) and software program 114 (FIG. 1) in client computer 102 (FIG. 1), and the hierarchical node controller program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the hierarchical node controller program 108A (FIG. 1) and software program 114 (FIG. 1) in client computer 102 (FIG. 1) and the hierarchical node controller program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 910a, b can include a computer display monitor 920, a keyboard 930, and a computer mouse 934. External components 910a, b can also include touch screens, virtual keyboards, touch pads, pointing devices, and other human interface devices. Each of the sets of internal components 810a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
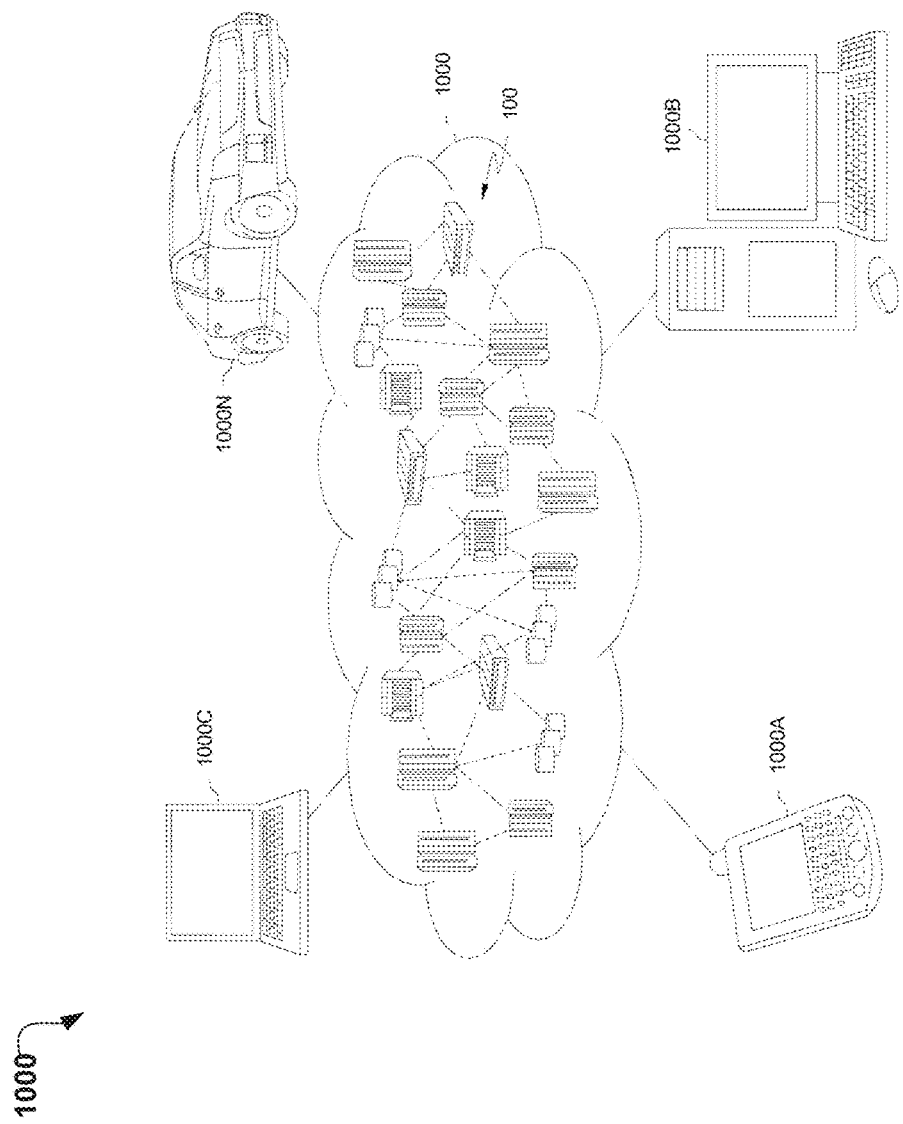
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
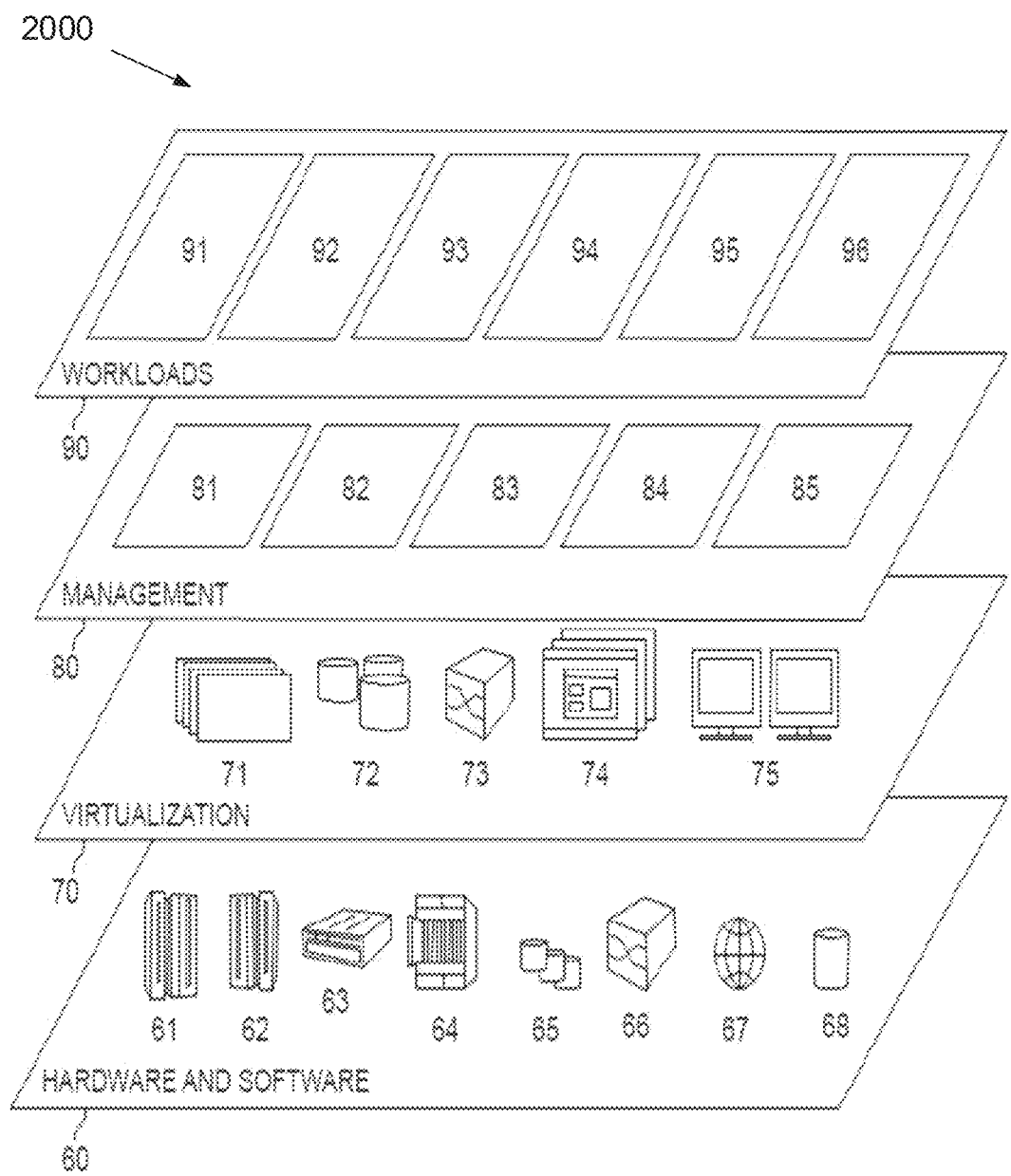
FIG. 8 is a block diagram of functional layers of the illustrative cloud computing environment of FIG. 7, in accordance with an embodiment of the present disclosure.

Referring now to FIG. 8, a set of functional abstraction layers 2000 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and hierarchical node controller 96. A hierarchical node controller program 108A, 108B (FIG. 1) may be offered "as a service in the cloud" (i.e., Software as a Service (SaaS)) for applications running on mobile devices 102 (FIG. 1) and may filter out nodes associated with hierarchical data structures.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system for generating node controllers on at least one hierarchical data structure associated with a computer database to improve navigation on the computer database, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
generating a plurality of node controllers on the at least one hierarchical data structure;
determining whether at least one user action is received on a first node controller associated with the generated plurality of node controllers;
in response to the determination that the at least one user action is received on the first node controller associated with the generated plurality of node controllers, filtering out at least one node level associated with the at least one hierarchical data structure, and presenting the at least one hierarchical data structure without the filtered out at least one node level;
determining whether the at least one user action is received on a second node controller associated with the generated plurality of node controllers;
in response to the determination that the at least one user action is received on the second node controller associated with the generated plurality of node controllers, filtering out at least one sibling node associated with the at least one hierarchical data structure, and presenting the at least one hierarchical data structure without the filtered out at least one sibling node;
determining whether the at least one user action is received on a third node controller associated with the generated plurality of node controllers;
in response to the determination that the at least one user action is received on the third node controller associated with the generated plurality of node controllers, reverse-collapsing at least one first node level and filtering out at least one second node level based on the reverse-collapsed at least one first node level, and presenting the at least one hierarchical data structure without the filtered out at least one second node level; and
wherein presenting the at least one hierarchical data structure without the filtered out at least one node level, presenting the at least one hierarchical data structure without the filtered out at least one sibling node, and presenting the at least one hierarchical data structure without the filtered out at least one second node level comprises presenting first data in the computer database at a closer distance to second data in the computer database than previously presented by the computer database to enable viewing the first data and the second data simultaneously on a computer screen.

2. The computer system of claim 1, wherein the first node controller is a first node level controller that is generated on at least one header associated with the at least one hierarchical data structure.

3. The computer system of claim 2, wherein the first node controller is a scroll bar based on a plurality of node levels, and wherein receiving the at least one user action on the first node controller further comprises:
receiving at least one position on the scroll bar.

4. The computer system of claim 1, wherein the second node controller is a sibling node controller that is generated on the at least one node associated with the hierarchical data structure.

5. The computer system of claim 4, wherein the second node controller is an arrow button, and wherein receiving the at least one user action on the second node controller further comprises:
receiving a user click on the arrow button; and
filtering out the at least one sibling node, wherein the filtered out at least one sibling node precedes a node that includes the user clicked on arrow button.

6. The computer system of claim 1, wherein the third node controller is a second node level controller that is generated on the at least one first node level associated with the hierarchical data structure.

7. The computer system of claim 6, wherein the third node controller is a node toggle, and wherein receiving the at least one user action on the third node controller further comprises:
receiving a user click on the node toggle; and
reverse-collapsing the at least one first node level and filtering out the at least one second node level, wherein the filtered out at least one second node level precedes the at least one first node level.

8. A computer program product for generating node controllers on at least one hierarchical data structure associated with a computer database to improve navigation on the computer database, comprising:
one or more computer-readable storage devices and program instructions stored on at least one of the one or more tangible storage devices, the program instructions executable by a processor, the program instructions comprising:
program instructions to generate a plurality of node controllers on the at least one hierarchical data structure;
program instructions to determine whether at least one user action is received on a first node controller associated with the generated plurality of node controllers;
program instructions to, in response to the determination that the at least one user action is received on the first node controller associated with the generated plurality of node controllers, filter out at least one node level associated with the at least one hierarchical data structure, and present the at least one hierarchical data structure without the filtered out at least one node level;
program instructions to determine whether the at least one user action is received on a second node controller associated with the generated plurality of node controllers;
program instructions to, in response to the determination that the at least one user action is received on the second node controller associated with the generated plurality of node controllers, filter out at least one sibling node associated with the at least one hierarchical data structure, and present the at least one hierarchical data structure without the filtered out at least one sibling node;
program instructions to determine whether the at least one user action is received on a third node controller associated with the generated plurality of node controllers;
program instructions to, in response to the determination that the at least one user action is received on the third node controller associated with the generated plurality of node controllers, reverse-collapse at least one first node level and filter out at least one second node level based on the reverse-collapsed at least one first node level, and present the at least one hierarchical data structure without the filtered out at least one second node level; and
wherein the program instructions to present the at least one hierarchical data structure without the filtered out at least one node level, the program instructions to present the at least one hierarchical data structure without the filtered out at least one sibling node, and the program instructions to present the at least one hierarchical data structure without the filtered out at least one second node level comprises program instructions to present first data in the computer database at a closer distance to second data in the computer database than previously presented by the computer database to enable viewing of the first data and the second data simultaneously on a computer screen.

9. The computer program product of claim 8, wherein the first node controller is a first node level controller that is generated on at least one header associated with the at least one hierarchical data structure.

10. The computer program product of claim 8, wherein the second node controller is a sibling node controller that is generated on the at least one node associated with the hierarchical data structure.

11. The computer program product of claim 10, wherein the second node controller is an arrow button, and wherein the program instructions to receive the at least one user action on the second node controller further comprises:

program instructions to receive a user click on the arrow button; and program instructions to filter out the at least one sibling node, wherein the filtered out at least one sibling node precedes a node that includes the user clicked on arrow button.

12. The computer program product of claim 8, wherein the third node controller is a second node level controller that is generated on the at least one first node level associated with the hierarchical data structure.

13. The computer program product of claim 12, wherein the third node controller is a node toggle, and wherein the program instructions to receive the at least one user action on the third node controller further comprises:

program instructions to receive a user click on the node toggle; and program instructions to reverse-collapse the at least one first node level and filter out the at least one second node level, wherein the filtered out at least one second node level precedes the at least one first node level.

* * * * *